United States Patent
Ten Kate

(10) Patent No.: US 6,801,578 B2
(45) Date of Patent: Oct. 5, 2004

(54) REPEATED DECODING AND ENCODING IN SUBBAND ENCODER/DECODERS

(75) Inventor: Warner R. T. Ten Kate, Eindhoven (NL)

(73) Assignee: Koninklijke Philips Electronics N.V., Einhoven (NL)

( * ) Notice: Subject to any disclaimer, the term of this patent is extended or adjusted under 35 U.S.C. 154(b) by 0 days.

(21) Appl. No.: 10/134,913

(22) Filed: Apr. 29, 2002

(65) Prior Publication Data

US 2002/0118764 A1 Aug. 29, 2002

Related U.S. Application Data

(62) Division of application No. 08/738,990, filed on Oct. 24, 1996, now Pat. No. 6,430,226.

(30) Foreign Application Priority Data

Oct. 24, 1995 (EP) .............................................. 95202866

(51) Int. Cl.[7] ............................................. H04L 27/00
(52) U.S. Cl. ...................................... 375/259; 370/537
(58) Field of Search ................................ 375/241, 240, 375/240.11, 242, 316, 259, 260, 285, 349; 370/537, 543; 341/101

(56) References Cited

U.S. PATENT DOCUMENTS

| | | | |
|---|---|---|---|
| 4,799,179 A | * | 1/1989 | Masson et al. |
| 4,896,362 A | * | 1/1990 | Veldhuis et al. .............. 381/30 |
| 4,972,484 A | | 11/1990 | Theile et al. |
| 5,105,463 A | * | 4/1992 | Veldhuis et al. .............. 381/30 |
| 5,146,457 A | * | 9/1992 | Veldhuis et al. ............. 370/111 |
| 5,243,428 A | * | 9/1993 | Challapali et al. ........... 358/167 |
| 5,295,224 A | * | 3/1994 | Makamura et al. ......... 704/223 |
| 5,323,396 A | | 6/1994 | Lokhoff ..................... 370/94.1 |
| 5,365,553 A | | 11/1994 | Veldhuis et al. ............. 375/122 |
| 5,367,608 A | | 11/1994 | Veldhuis et al. ............ 395/2.38 |
| 5,371,761 A | * | 12/1994 | Daffara et al. .............. 375/200 |
| 5,394,439 A | * | 2/1995 | Hemmati ..................... 375/242 |
| 5,579,404 A | | 11/1996 | Fielder et al. |
| 5,581,651 A | * | 12/1996 | Ishino et al. |
| 5,661,755 A | * | 8/1997 | Van De Kerkhof et al. 375/242 |

FOREIGN PATENT DOCUMENTS

| | | | | |
|---|---|---|---|---|
| EP | 0400755 A1 | 12/1990 | ............ | H04B/1/66 |
| EP | 0402973 A1 | 12/1990 | ........... | G11B/20/10 |
| EP | 0457390 A1 | 11/1991 | ............ | H04B/1/66 |
| EP | 0457391 A1 | 11/1991 | ............ | H04B/1/66 |

* cited by examiner

Primary Examiner—Jean B. Corrielus
(74) Attorney, Agent, or Firm—Michael E. Belk

(57) ABSTRACT

An encoding apparatus is provided for encoding a wideband digital signal, comprising an input for receiving the wideband digital signal, a splitter unit for splitting the wideband digital signal into a number of M sub signals and a formatting unit for assembling digital information including said data reduced sub signals into a digital output signal having a format suitable for transmission or storage. During a repeated encoding and decoding of a wideband digital signal in a subband encoding/decoding system or a transform encoding/decoding system, signal degradation may occur. In order to avoid this, the apparatus further comprises a variable delay unit coupled between the input and the splitter unit, for realizing a delay, the length of which is controlled by a control signal, and a control signal generator unit for generating said control signal.

7 Claims, 5 Drawing Sheets

REPEATED DECODING AND ENCODING IN SUBBAND ENCODER/DECODERS

CROSS REFERENCE TO RELATED APPLICATIONS

This is a divisional of application Ser. No. 08/738,990, filed Oct. 24, 1996 now U.S. Pat. No. 6,430,226.

BACKGROUND OF THE INVENTION

1. Technical Field

The invention relates to an apparatus for encoding a wideband digital signal, the apparatus comprising input means for receiving the wideband digital signal, and splitter means for splitting the wideband digital signal into a number of M sub signals, M being an integer larger than one, formatting means for assembling digital information including said sub signals into a digital output signal having a format suitable for transmission or storage, to a method of encoding, to control signal generator means that can be used in the apparatus, to a decoding apparatus and to a decoding method.

2. Related Art

An encoding apparatus as defined in the opening paragraph is well known in the form of a subband encoder or a transform encoder. Reference is made in this respect to EP-A 402.973, document D2 in the list of related documents that can be found at the end of this description.

SUMMARY OF THE INVENTION

The invention has for its object to provide an improved encoding apparatus. The apparatus in accordance with the invention as defined in the foregoing is characterized in that the apparatus further comprises delay means coupled between the input means and the splitter means, for realizing a specific delay of the wideband digital signal.

The invention is based on the following recognition. Investigations carried out on the quality of a wideband digital signal that has been repeatedly encoded and decoded, have resulted to the conclusion that such repeated encoding and decoding may lead to some signal degradation. It was recognized that one of the causes of this signal degradation was the difference in the timing in a decoder and a subsequent encoder. More specifically, it was recognized that, in a system where a decoding apparatus is coupled to a subsequent encoding apparatus, the signal delay as a result of the series connection of synthesis filter means present in the decoding apparatus and the splitter means present in the encoding apparatus and their interconnection is an important factor. This, in the sense that this delay should be equal to MT, or equal to an integer multiple of M.T, where T is the sampling period of the wideband digital signal, in order to have the lowest signal degradation.

If this delay is however not equal to MT or to an integer multiple of M.T, the additional delay means as claimed should be inserted between the output of the synthesis filter means and the input of the splitter means, the delay of the additional delay means being such that the total delay, inclusive the delay of the delay means, satisfies the above requirement.

As a result, a delay means having a fixed delay can be included in the input means of the encoding apparatus or in the output means of the decoding-apparatus, assuming that the splitter means in any encoding apparatus have all the same delay and that the synthesis filter means in any decoding apparatus have the same delay.

If wideband digital signals have been obtained upon decoding in a decoding apparatus having splitting filter means of an unknown delay, it will be necessary to incorporate a variable delay in the encoding apparatus in order to satisfy the requirement that the total delay equals M.T or equals an integer multiple of M.T.

BRIEF DESCRIPTION OF THE DRAWINGS

These an other aspects of the invention will be further elucidated in the following figure description, which shows in FIG. 1 a prior art encoder/transmitter, FIG. 2 a prior art decoder/receiver, FIG. 3 an encoder/transmitter in accordance with the invention, FIG. 4 an embodiment of the delay unit and the control signal generator shown in FIG. 3, FIG. 5 another embodiment of the control signal generator.

DETAILED DESCRIPTION OF THE DRAWINGS

Figure 1:
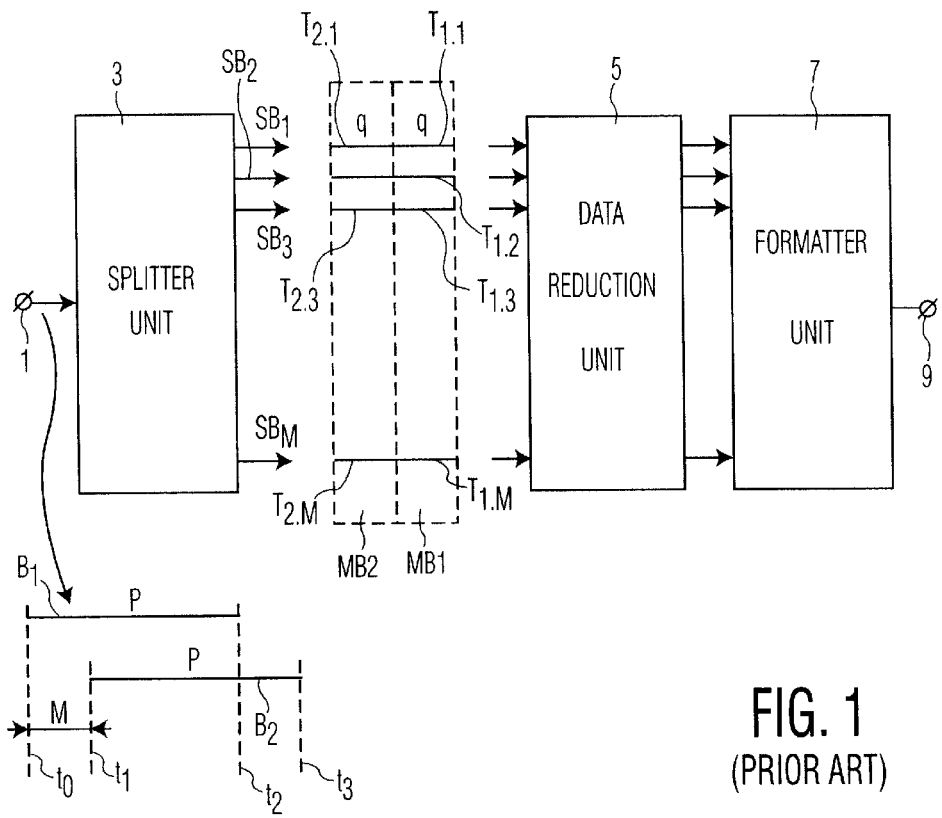

FIG. 1 shows schematically a prior art apparatus for encoding a wideband digital signal, such as a wideband digital audio signal. The wideband digital audio signal may have a sampling frequency of 44.1 kHz, and samples of the wideband digital signal are applied to an input terminal 1. A splitter unit 3 is provided for splitting the wideband digital signal into M sub signals. In the present example, it is assumed that the splitter unit 3 splits the wideband digital signal into M subband signals. Such encoder is called a subband encoder. Another type of encoder that could have been used here is a transform coder, well known in the art.

M subband signals $SB_1$ to $SB_M$ are generated at M outputs of the splitter unit 3. Those subband signals are supplied to a data reduction unit 5, in which a data reduction step is carried out on the M subband signals so as to obtain M data reduced subband signals. Those M data reduced subband signals are supplied to a formatter unit 7 so as to convert the M data reduced subband signals, together with other type of information, such as scale factors and bit allocation information, into a datastream that can be supplied to an output terminal 9, for storage on a record carrier or in a memory, or for transmission via a transmission medium.

This is all well known in the art. Reference is made to various publications disclosing an apparatus as schematically described above, see eg. the references D1 to D4 given in the list of related documents that can be found at the end of this description.

More specifically, a block B1 of P samples occurring in a time interval $(t_0, t_2)$ of the wideband digital signal is applied to the terminal and 1 is converted into M samples, more specifically converted into one time equivalent sample of each of the M subband signals. The next block $B_2$ of P samples occurring in a time interval $(t_1,t_3)$ of the wideband digital signal is converted into the next M time equivalent subband samples, one in each of the M subband signals. As will be clear from FIG. 1, the blocks $B_1$ and $B_2$ overlap each other, because the block $B_2$ is shifted in time over M samples compared to the block $B_1$.

Time equivalent signal blocks of q samples each, one time equivalent signal block in each of the subband signals, are compressed in the data reduction unit 5 in a well known way. Those time equivalent signal blocks are denoted $T_{1,1}$ to $T_{1,M}$ in FIG. 1 and form a macroblock $MB_1$. A subsequent macroblock $MB_2$ of M time equivalent signal blocks $T_{2,1}$ to $T_{2,M}$ is also shown in FIG. 1.

The apparatus described in FIG. 1 can be an apparatus for recording digital information on a record carrier, such as a magnetic record carrier. As example of such apparatus is a recording apparatus of the DCC type.

Figure 2:
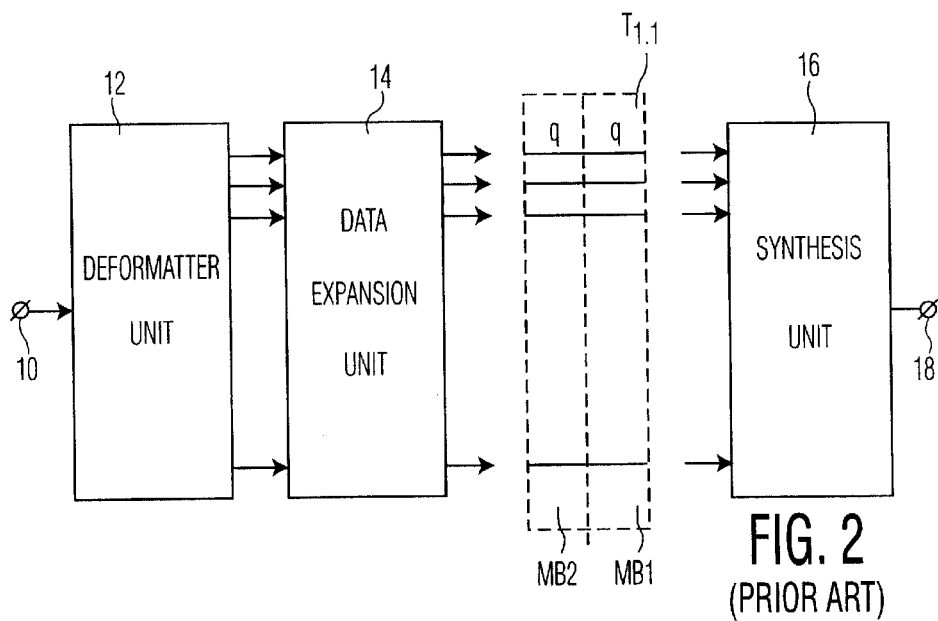

FIG. 2 shows an apparatus capable of decoding (reproducing) the information encoded (recorded) by the apparatus of FIG. 1. The information transmitted is received via an input terminal 10 and supplied to a deformatter unit 12, which retrieves the data reduced subband signals and additional information, such as scale factors and bit allocation information, from the transmitted signal. In a data expansion unit 14, the data reduced subband signals are reconverted into subband signals (using the scale factors and the bit allocation information). In the synthesis unit 16, those subband signals are combined so as to obtain a replica of the original wideband signal at the output terminal 18.

It will be clear that one may be able to identify in the decoder of FIG. 2 the same macroblocks $MB_1$ and $MB_2$ as in the encoder of FIG. 1. As a result, an encoding by means of the encoding apparatus of FIG. 1, followed by a decoding by means of the decoding apparatus of FIG. 2, can be carried out on the wideband digital signal without an introduction of an audible distortion.

A problem may now occur during a repeated encoding (recording) and decoding (reproduction) of the same wideband digital signal. Tests have made clear that if the same wideband signal is copied a large number of times, signal degradation may occur. Copying of the wideband signal means that the signal supplied by the decoder (reproducer) of FIG. 2 is encoded (recorded) again by an encoder (recorder) of FIG. 1. Investigation have led to the following recognition.

Figure 6:
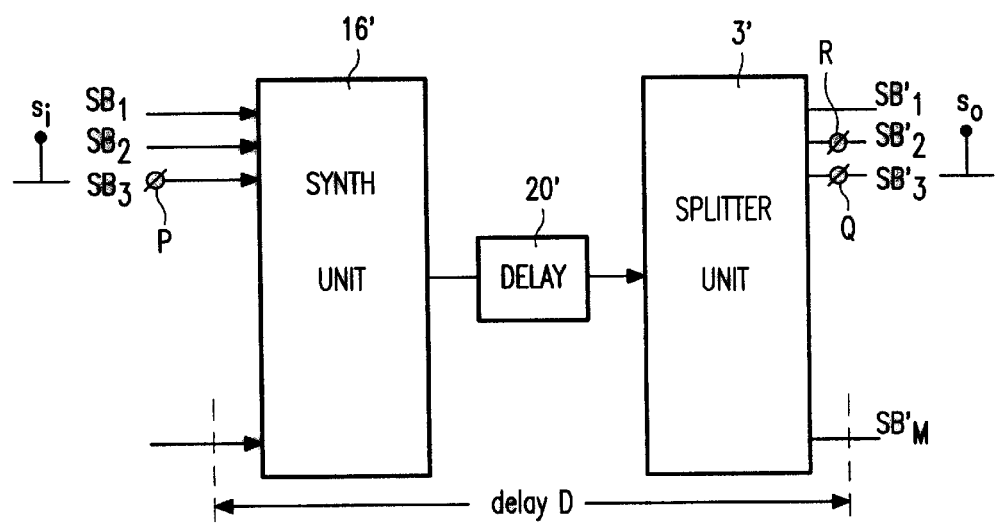
FIG. 6 shows the combination of decoding/reproduction and subsequent encoding/recording.
Figure 7A:
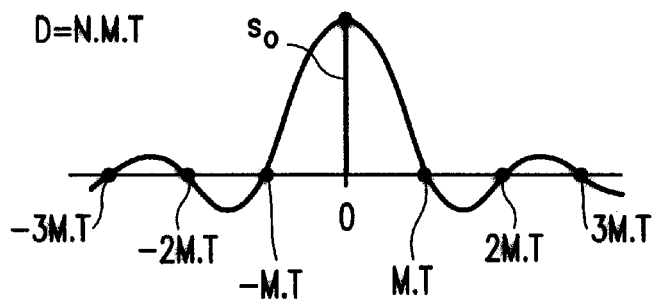
FIG. 7 shows in (a) the in-band impulse response for a delay between decoding/reproduction and encoding/recording in the optimal situation and in (b) the in-band impulse response for a delay other than the delay in the optimal situation.
Figure 7B:
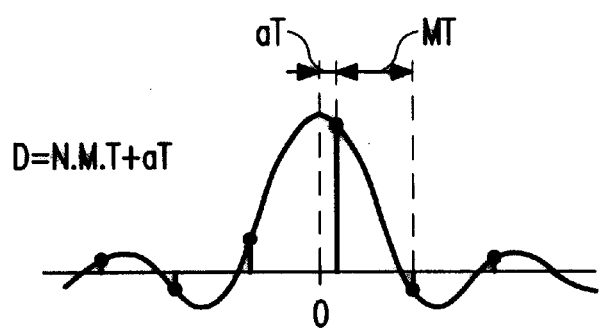
Figure 8A:
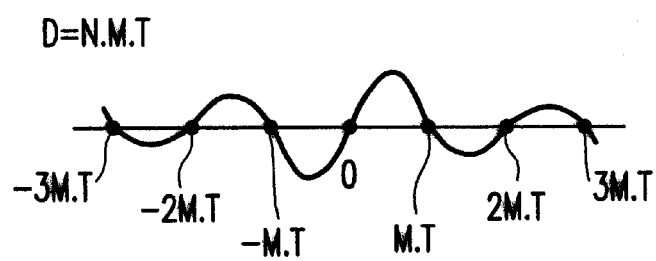
FIG. 8 shows in (a) the neighbouring-band impulse response for a delay between decoding/reproduction and encoding/recording in the optimal situation and in (b) the neighbouring-band impulse response for a delay other than the delay in the optimal situation.
Figure 8B:
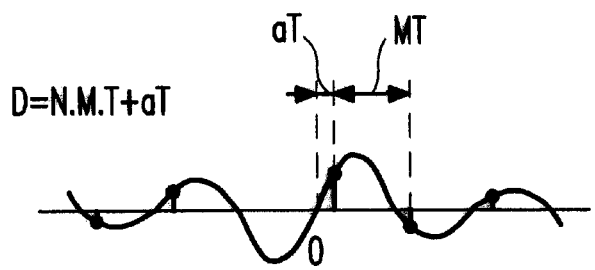

The FIGS. 6, 7 and 8 show the signal behaviour during copying of a wideband digital signal. FIG. 6 shows the decoding/reproduction step, more specifically, the step of synthesizing the subband signals $SB_1$ to $SB_M$ into a wideband digital signal by means of a synthesizing unit 16', and the encoding/recording step, more specifically, the splitter step in a splitter unit 3', so as to obtain the subband signals $SB_1'$ to $SB_M'$.

Assume for the moment that the delay element 20' is absent. Further, as the synthesis step in the synthesis unit 16' and the subsequent splitting step in the splitter unit 3' are assumed to have an ideal transmission characteristic of unity, this means that the subband signals $SB_1'$ to $SB_M'$ will be equal the subband signals $SB_1$ to $SB_M$ respectively, except for a specific time delay D. This delay is caused by the internal delays of the synthesis unit 16' and the splitter unit 3', and other delays (if present, such as the delay unit 20') in the connection between the synthesis unit 16' and the splitter unit 3'. Investigations have led to the conclusion that, if the delay D equals an integral number N of M.T, where T is the time interval between successive samples of the wideband signal, this transmission characteristic is indeed the best approximation of a unity transmission characteristic. For other values for the delay D, the transmission is less ideal, so that distorted subband signals $SB_1'$ to $SB_M'$ appear at the outputs of the splitter unit 3'. This will be further explained with reference to the FIGS. 7 and 8.

Referring to (a) in FIG. 7, this shows the 'in-band' impulse response H(P,Q) of the circuit located between the circuit points P and Q in FIG. 6, as a result of an impulse $s_i$ supplied to the circuit at point P. (a) in FIG. 8 shows the 'neighbouring-band' impulse response H(P,R) of the circuit located between the circuit points P and R in FIG. 6 as a result of the impulse $s_i$ supplied to the circuit point P. For subbands lying further away than the neighbouring bands, an alike impulse response as shown in (a) of FIG. 8 exists. If the delay D is such that it equals M.T or equals an integer multiple of M.T, the in-band impulse response will result in samples at time instants . . . , −3M.T, −2M.T, −M.T, 0, M.T, 2M.T, 3M.T, . . . As the impulse response is however zero at the time instants . . . , −3M.T, −2M.T, M.T, −M.T, M.T., 2M.T, 3M.T . . . , this means that the impulse response results in exactly one impulse $s_o$ at time instant 0, see FIG. 6. Further, samples occur at the time instants . . . , −3M.T, −2M.T, −M.T, 0, M.T, 2M.T, 3M.T, . . . in the neighbouring-band impulse response of (a) of FIG. 8. As this impulse response is zero at all those time instants, no sample value will appear in the neighbouring subband.

Assuming now that the delay D is different from N.M.T, where N is an integer larger than −1. More precisely, the delay is assumed to be equal to N.M.T+a.T, where a is an integer for which holds 0<a<M−1. As a result, (b) of FIG. 7 shows the in-band impulse response at the circuit point Q. A number of impulses occur spaced at time intervals M.T apart and shifted over a time interval a.T compared to t=0. (b) of FIG. 8 shows the neighbouring-band response for this time delay. Again, impulses occur spaced at time intervals M.T apart and shifted over a time interval a.T compared to t=0. The non-zero neighbouring-band response is the cause of the increase in distortion when repeatedly copying the wideband digital signal.

From the foregoing, it will be clear that the requirement that the delay D should be equal to M.T or to an integer multiple of M.T should be satisfied in order to minimize distortion when repeatedly copying the wideband digital signal. If the delay in the synthesis filter unit 16' and the delay in the splitter unit 3' is unequal to N.M.T, the above requirement can still be met by inserting the delay unit 20' and choosing the internal delay of the delay unit 20' such that the total delay D satisfies the above requirement. As an example, if we study the situation described with reference to (b) in FIG. 7 and (b) in FIG. 8, where the delay D without the insertion of the delay unit 20', was equal to N.M.T+a.T, it will be clear that, if the delay unit 20' realizes. an internal delay of (M−a).T, the total delay again becomes an integral multiple of M.T.

When changing the value for the delay D from an integral multiple of M.T to the next higher integral multiple of M.T, it can be established that the total energy of the subband signals at the output of the splitter unit 3' is the lowest for a delay D equal to an integral multiple of M.T, but higher for other delays.

In one embodiment of the invention, the encoding apparatus may be provided with the (fixed) delay 20', which is set to such a delay value that the total delay D as shown in FIG. 6 is equal to N.M.T. In another embodiment of the invention, the decoding apparatus may be provided with the (fixed) delay 20', which is again set to such a delay value that the total delay D as shown in FIG. 6 is equal to N.M.T. Both embodiments are possible if the internal delay in the synthesis units 16' of decoding apparatuses have all the same and known delay value, and also the internal delay in the splitter units 3' of encoding apparatuses have all the same and known delay value.

Figure 3:
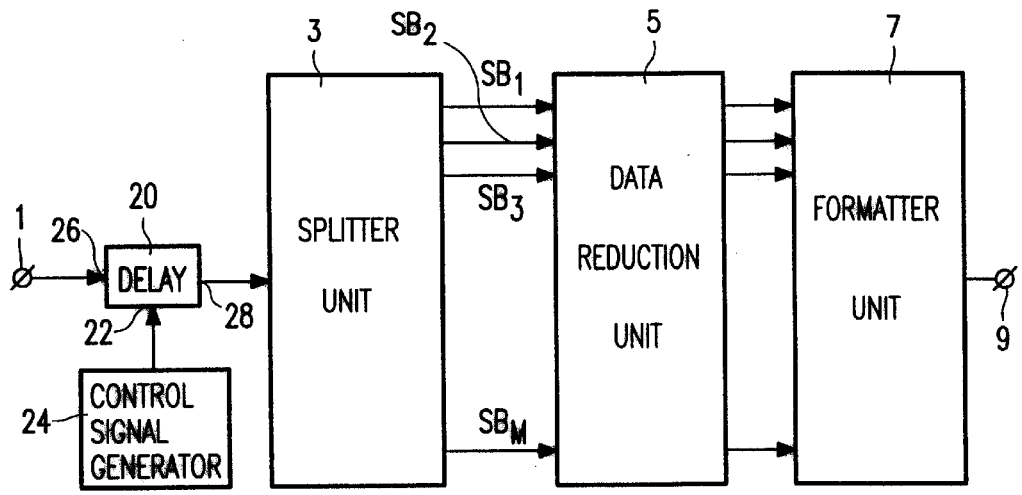

In another embodiment of the invention, as shown in FIG. 3, the encoding apparatus is provided with a variable delay unit 20, present between the input terminal 1 and the splitter unit 3. The variable delay unit 20 realizes a delay of the wideband digital signal. This delay can be equal to m.T, where T equals $1/f_s$, $f_s$ being the sampling frequency of the wideband digital signal. m is an integer value between 0 and M−1. The delay can also be larger, more specifically, m.T+ N.M.T. Preferably, however the delay 20 is capable of realizing a delay m.T, between 0 and (M−1).T. The delay unit 20 has a control signal input 22 for receiving a control signal that controls the value of m, and thus control the amount of delay realized. A control signal generator 24 is present for generating the control signal.

The value m is controlled in such a way that the delay D, as defined in FIG. 6, equals N.M.T. As has been explained above, the exact setting of the delay 20 can be established by determining the (total) power in the subbands $SB_1$ to $SB_M$, generated by the splitter unit 3. If this (total) power is minimum, the delay 20 is set to the correct value so that D equals N.M.T.

Figure 4:
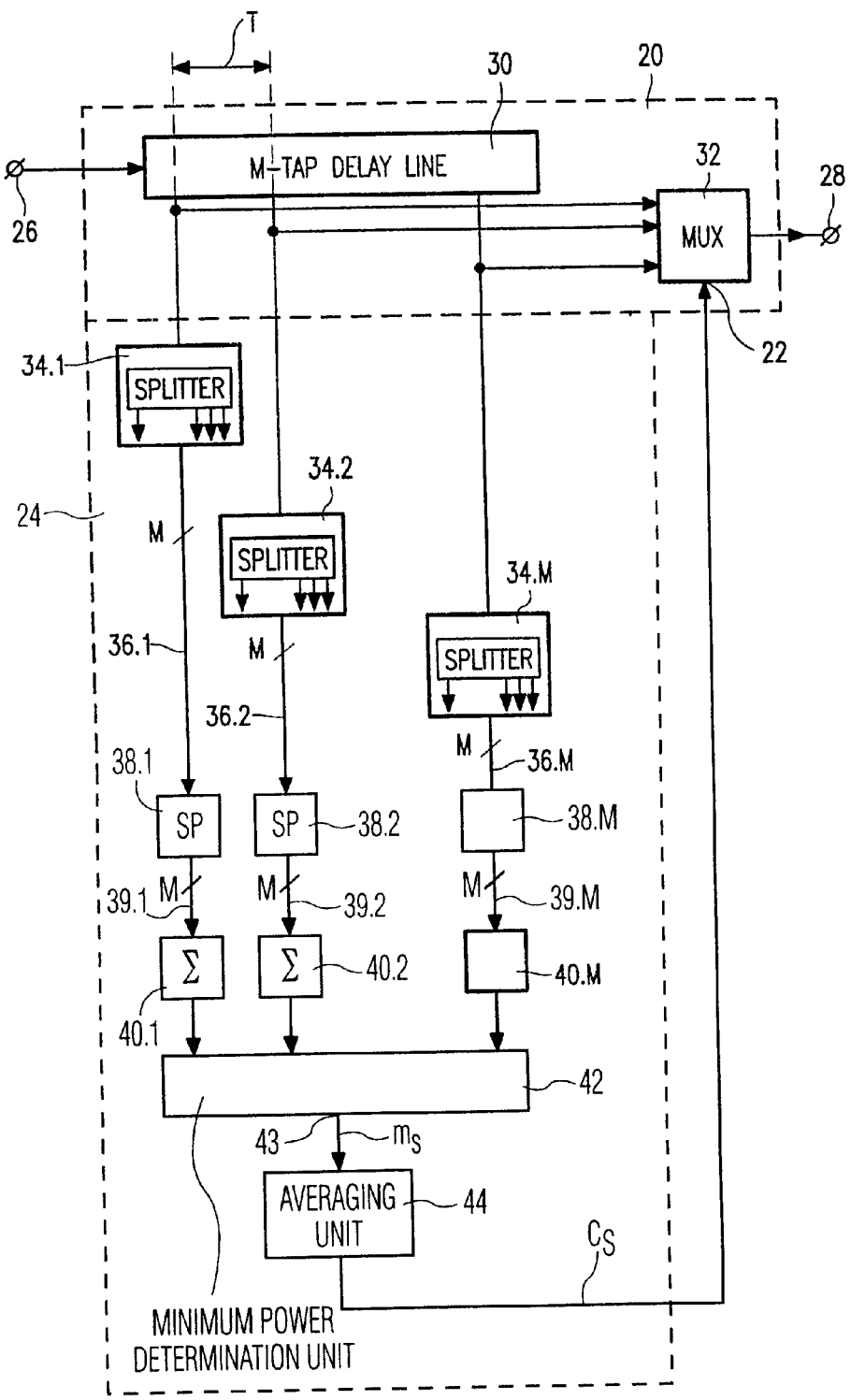

FIG. 4 shows an elaborated version of the delay unit 20 and the control signal generator 24. The delay unit 20 comprises an M-tap delay line 30 having an input coupled to the input 26 of the delay unit 20 and M taps as outputs coupled to corresponding inputs of a multiplexer 32. An output of the multiplexer 32 is coupled to the output 28 of the delay unit 20. The control signal generator 24 comprises M splitter units 34.1 to 34.M. The splitter units 34.1 to 34.M are identical to the splitter unit 3 of FIG. 1, as far as their signal delays are concerned. The splitter units 34.1 to 34.M have each an input coupled to a corresponding one of the M taps of the delay line 30. The splitter units 34.1 to 34.M each generate M subband signals that are supplied via the lines 36.1 to 36.M respectively to corresponding signal power determination units 38.1 to 38.M. The power determination units 38.1 to 38.M determine the signal power in each of the subband signals supplied by one of the splitter units, resulting in M power values, one for each of the subband signals. Those power values are supplied via the lines 39.1 to 39.M to summation units 40.1 to 40.M for summing the power values in all of the M subbands so as to obtain a summed version of all the M power values. This summation can be realized in the dB domain, so that this summation is effectively a multiplication of the power values in the linear domain. The summed powers thus obtained are supplied to a minimum power determination unit 42. The unit 42 determines which of the M summed powers is the smallest and generates a signal at its output 43 indicating which of the M delays has resulted in this smallest summed power value. The signal supplied at the output 43 is thus an indication of this delay, and is indicated by a specific value for m. Some averaging over a number of measurements is required in an averaging unit 44, in order to derive the control signal $c_s$ that is supplied to the control signal input 22 of the multiplexer 32. The multiplexer 32 selects in response to the control signal $c_s$ applied to its input 22 those signal from the M taps of the delay line 30 that has led on the average to the minimum summed power.

The determination of the minimum of the summed power can be done slightly different from the way as shown in FIG. 4. In an alternative of the embodiment of FIG. 4, the control unit 24 comprises only two series arrangements of a splitter unit, such as the splitters 34.1 and 34.2, a power determination unit, such as the units 38.1 and 38.2, and a summation unit, such as the units 40.1 and 40.2, which series arrangements are coupled to a minimum power determination unit.

In a first measurement, the two series arrangements are coupled to, for example, the first two taps of the delay line 30 and the minimum of the two powers is determined. Next, a second measurement is carried out. One of the series arrangements that led to the minimum of the two powers remains connected to the same tap during the second measurement. The other series arrangement is coupled to, for example, the third tap of the delay line 30. In the second measurement, again the minimum of the two powers calculated is determined. Next, a third measurement is carried out. The series arrangement that resulted in the minimum of the two powers in the second measurement remains connected to the same tap as during the second measurement. The other series arrangement is coupled to the fourth tap of the delay line 30. In the third measurement, again the minimum of the two powers calculated is determined. This is continued until all the taps have been used in a measurement. The tap corresponding to the minimum power determined in the last measurement now relates to the delay to be selected by the multiplexer 32.

Figure 5:
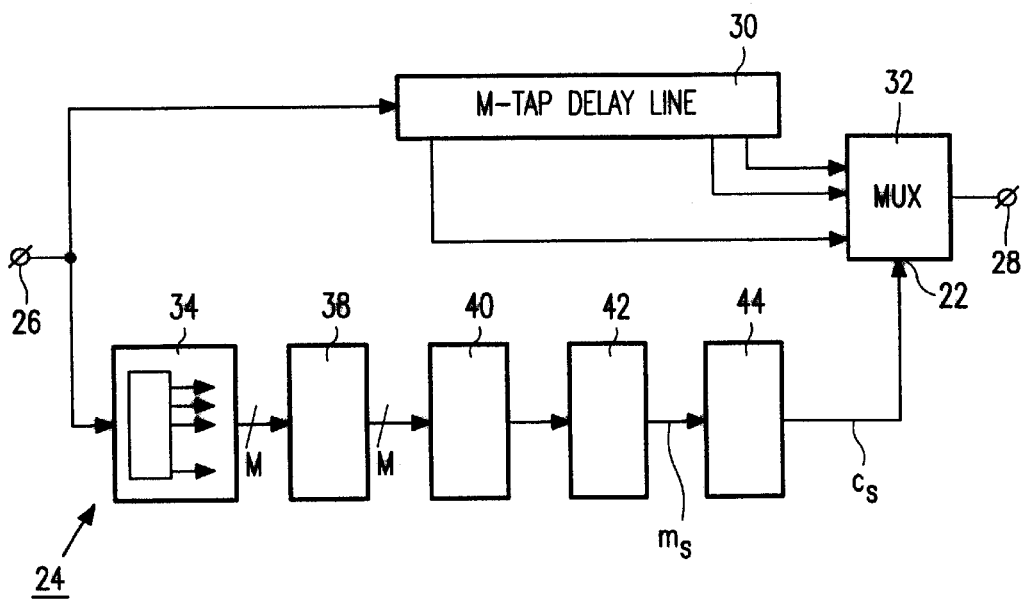

FIG. 5 shows another embodiment of the control unit 24, denoted by the reference numeral 24'. The unit 24' shows a large resemblance with the unit 24 of FIG. 4. The unit 24' comprise one splitter unit 34, for subband splitting the wideband digital signal applied to the input 26. The subband signals generated by the unit 34 are supplied to power determination unit 38. for determining the powers in the subband signals. A summation unit 40 is present for summing the M powers of the M subband signals, so as to obtain a summed power value. For M subsequent system cycles, that is for M subsequent delays of the wideband signal applied to the input 26, a summed power value is determined by the unit 40. The M summed power values are supplied to the unit 42 for determining the smallest summed power value of the M summed power value. After averaging in an averaging unit 44, the control signal $c_s$, is generated, which control signal is supplied to the control signal input 22 of the multiplexer 32.

The derivation of the control signal $c_s$ need not necessarily be realized on the basis of the total power of the subband signals, but can also be derived from an estimation of the total power, which may be the estimation of the power in one or more of the subbands only, but not all of the subbands.

An encoding apparatus is thus provided for encoding a wideband digital signal, comprising an input (1) for receiving the wideband digital signal, a splitter unit (3) for splitting the wideband digital signal into a number of M sub signals and a formatting unit (7) for assembling digital information including said data reduced sub signals into a digital output signal having a format suitable for transmission or storage.

During a repeated encoding and decoding of a wideband digital signal in a subband encoding/decoding system or a transform encoding/decoding system, signal degradation may occur. In order to avoid this, the apparatus further comprises a delay unit, more specifically, a variable delay unit (20) coupled between the input (1) and the splitter unit (3), for realizing a delay. In the case of a variable delay unit, the length of the delay realized by the delay unit is controlled by a control signal. A control signal generator unit (24) is present for generating said control signal.

Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the wideband digital signal need not necessarily be a wideband digital audio signal, but could be any wideband data signal.

List of related documents to be printed on the front page of the patent document.

(D1) EP-A 400.755 (PHQ 89.018)

(D2) EP-A 402.973 (PHN 13.241)

(D3) EP-A 457.390 (PHN 13.328)

(D4) EP-A 457.391 (PHN 13.329)

What is claimed is:

1. An apparatus for decoding M sub signals so as to obtain a wideband digital signal, the apparatus comprising:

input means for receiving the M sub signals;

synthesis filter means for combining the M sub signals into wideband digital signal, M being an integer larger than one;

output means for supplying the wideband digital signal; and delay means coupled between the synthesis filter means and the output means, for realizing a specific delay of the wideband digital signal.

2. The apparatus of claim 1, wherein the delay reduces signal degradation in repeated encoding and decoding.

3. The apparatus of claim 1, wherein the decoding apparatus is a subband or transform decoder.

4. Method of decoding M sub signals so as to obtain a wideband digital signal, the method comprising the steps of:

receiving the M sub signals;

combining the M sub signals into said wideband digital signal, M being an integer larger than one;

supplying the wideband digital signal;

in which the method further comprises the step of delaying for realizing a specific delay of the wideband digital signal which delay reduces signal degradation in repeated encoding and decoding.

5. A method as claimed in claim 4, in which the wideband digital signal is delayed in the delay step by a delay of $(m+N*M)*T$ where m is an integer constant such that: $0<m<M-1$, N is an integer constant larger than $-1$, and T is the time interval between two subsequent samples in the wideband digital signal.

6. A method comprising, repeatedly encoding a wideband digital signal to create M sub signals and decoding the M sub signals so as to regain the wideband digital signal, wherein the decoding comprises:

receiving the M sub signals;

combining the M sub signals into the wideband digital signal, M being an integer larger than one;

supplying the wideband digital signal; and delaying the wideband digital signal, so that signal degradation is reduced in comparison to a method lacking the delaying.

7. The method of claim 6, wherein the delaying comprises delaying the wideband digital signal by a delay of $(m+N*M)*T$ where m is an integer constant such that: $0<m<M-1$, N is an integer constant larger than $-1$, and T is the time interval between two subsequent samples in the wideband digital signal.

\* \* \* \* \*